(12) United States Patent
Tanaka et al.

(10) Patent No.: US 12,164,691 B2
(45) Date of Patent: Dec. 10, 2024

(54) SKILL ACQUISITION ASSISTANCE METHOD, SKILL ACQUISITION ASSISTANCE SYSTEM, AND COMPUTER READABLE RECORDING MEDIUM STORING CONTROL PROGRAM

(71) Applicants: NAGOYA INSTITUTE OF TECHNOLOGY, Nagoya (JP); KYOTO TACHIBANA EDUCATIONAL INSTITUTION, Kyoto (JP); KONICA MINOLTA, INC., Tokyo (JP)

(72) Inventors: Yoshihiro Tanaka, Nagoya (JP); Hikari Yukawa, Nagoya (JP); Takayuki Kodama, Kyoto (JP); Masashi Odagiri, Kyoto (JP); Masayuki Satou, Hino (JP); Masahiko Kurachi, Hino (JP); Michiya Takeda, Toyokawa (JP)

(73) Assignees: NAGOYA INSTITUTE OF TECHNOLOGY, Nagoya (JP); KYOTO TACHIBANA EDUCATIONAL INSTITUTION, Kyoto (JP); KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/318,941

(22) Filed: May 17, 2023

(65) Prior Publication Data
US 2023/0384864 A1 Nov. 30, 2023

(30) Foreign Application Priority Data
May 31, 2022 (JP) ................... 2022-088269

(51) Int. Cl.
*G06F 3/01* (2006.01)
*G06Q 10/0631* (2023.01)

(52) U.S. Cl.
CPC ..... *G06F 3/016* (2013.01); *G06Q 10/063112* (2013.01)

(58) Field of Classification Search
USPC ........................................................ 345/156
See application file for complete search history.

(56) References Cited

U.S. PATENT DOCUMENTS

2015/0032492 A1* 1/2015 Ting ............... G06Q 10/063112
705/7.14
2019/0196596 A1* 6/2019 Yokoyama ............. G06F 3/011
(Continued)

FOREIGN PATENT DOCUMENTS

WO 2020100671 A1 5/2020

*Primary Examiner* — Chineyere D Wills-Burns
(74) *Attorney, Agent, or Firm* — Buchanan Ingersoll & Rooney PC (57) ABSTRACT

A skill acquisition assistance method includes a first stimulus generating step of acquiring first and second tactile data indicating tactile senses corresponding to a first body part based on an action of the first body part during work time when first and second workers perform the same work and generating a first stimulus based on the first tactile data by a stimulus transmission section mounted on a second body part different from the first body part of the first worker and a second stimulus generating step of switching a stimulus generated by the stimulus transmission section to a second stimulus based on the second tactile data in conjunction with the action of the first body part of the first worker.

19 Claims, 6 Drawing Sheets

(56) References Cited

U.S. PATENT DOCUMENTS

| | | | |
|---|---|---|---|
| 2021/0004086 A1* | 1/2021 | Yokoyama | G06F 3/016 |
| 2021/0174771 A1* | 6/2021 | Maezawa | G10H 1/0008 |
| 2021/0235871 A1* | 8/2021 | Tsuda | A47C 1/12 |
| 2021/0383714 A1* | 12/2021 | Furuya | G09B 15/023 |
| 2022/0276710 A1* | 9/2022 | Yokoyama | G06F 1/163 |
| 2023/0152891 A1* | 5/2023 | Yokoyama | G06F 3/04883 |
| | | | 715/702 |

* cited by examiner

SKILL ACQUISITION ASSISTANCE METHOD, SKILL ACQUISITION ASSISTANCE SYSTEM, AND COMPUTER READABLE RECORDING MEDIUM STORING CONTROL PROGRAM

CROSS-REFERENCE TO RELATED APPLICATION

The entire disclosure of Japanese patent application No. 2022-088269, filed on May 31, 2022, is incorporated herein by reference in its entirety.

BACKGROUND

1. Technological Field

The present invention relates to a skill acquisition assistance method, a skill acquisition assistance system, and a computer readable recording medium storing a control program.

2. Description of the Related Art

Due to the shortage of successors and the aging of workers in the field of making things such as traditional craft and manufacturing industries, increasing businesses are temporarily or permanently closed. This has recently been a social problem. In addition, in the fields of medicine, construction, art, and others, the succession of advanced skills is not easy. This poses a problem for the future.

In addition, it is difficult to say that a system capable of efficiently transferring skills to learners in physical skills which are difficult to be automated by robots, AI, and the like has been established in production sites of making things and other work sites in spite of efforts to raise successors. Educational methods of seeing and remembering the work of skilled persons and conventional, experiential, and subjective skill transfer are still mainstream. Such methods currently require long learning times.

A conventional method of transferring skills to a person who learns physical skills is to observe the work of a skilled person or to receive oral guidance by subjective sensory expressions. Although it is important to transfer the sensory details of a skilled person to a learner in transferring physical skills, it takes a long time to sufficiently transfer skills by work observation or oral guidance and for the learner himself or herself to grasp technical tips.

In order to cope with such a problem, the information processing apparatus disclosed in WO 2020/100671 (Japanese Patent Application No. 2020-556101) assists the acquisition of performance by repeatedly performing training using a simulator linked to the kinesthetic sense information of a skilled person. In this information processing apparatus, an exoskeleton member is operated by a kinesthetic sense mechanism attached to a fingertip to apply a force to a finger or a joint of the user, thereby allowing the learner to recognize how much force in an extension or bending direction of the joint is excessive or insufficient.

SUMMARY

However, during work by the user, since a plurality of pieces of information, that is, the somesthetic information of the learner and the presentation information of the somesthetic sense of the skilled person, are simultaneously given to the same place of the body part that performs the work, these pieces of information interfere with each other. Therefore, it is difficult for the learner to understand and it is not possible to directly compare the somatic sensation (somesthetic sense) of the learner during work by himself/herself with the somatic sensation of the skilled person. Furthermore, hindrance to the work by the tactile presentation device worn on the fingertip poses a problem, and a sufficient learning effect may not be obtained.

The present invention has been made in consideration of the above-described circumstances, and an object of the present invention is to make it possible for a learner to recognize and compare the tactile sense of his/her own body part with the tactile sense of a skilled person without disturbing the tactile sense of his/her body part or the action during work when the learner performs work as a skill learning target, and to immediately correct the action of the learner himself/herself without affecting workability.

To achieve at least one of the abovementioned objects, according to an aspect of the present invention, a method reflecting one aspect of the present inventions comprises the followings.

There is provided a skill acquisition assistance method including a first tactile data acquisition step of acquiring first tactile data indicating a tactile sense corresponding to a first body part based on an action of the first body part during work time when a first worker performs work,
   a second tactile data acquisition step of acquiring second tactile data indicating a tactile sense corresponding to a first body part based on an action of the first body part during work time when a second worker performs the same work,
   a first stimulus generating step of generating a first stimulus based on the first tactile data by a stimulus transmission section mounted on a second body part different from the first body part of the first worker, and
   a second stimulus generating step of switching a stimulus generated by the stimulus transmission section to a second stimulus based on the second tactile data in conjunction with the action of the first body part of the first worker.

To achieve at least one of the abovementioned objects, according to an aspect of the present invention, a system reflecting one aspect of the present inventions comprises the followings.

There is provided a skill acquisition assistance system including a sensor section that acquires tactile data indicating a tactile sense corresponding to a first body part based on an action of the first body part during work,
   a stimulus transmission section that is worn on a second body part different from the first body part and transmits a stimulus to the second body part, and
   a hardware processor that causes the stimulus transmission section to generate a stimulus based on the tactile data,
   wherein the hardware processor acquires first tactile data during work performed by a first worker and second tactile data during the same work performed by a second worker,
   causes the stimulus transmission section worn by the first worker to generate a first stimulus based on the first tactile data, and
   switches a stimulus generated by the stimulus transmission section to a second stimulus based on the second tactile data in conjunction with an action of the first body part of the first worker.

The objects, features, and characteristics of this invention other than those set forth above will become apparent from the description given herein below with reference to preferred embodiments illustrated in the accompanying drawings.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Embodiments of the present invention will be described hereinafter with reference to the accompanying drawings. However, the scope of the invention is not limited to the disclosed embodiments. In the description of the drawings, the same components are denoted by the same reference numerals, and overlapping description will be omitted. In addition, dimensional ratios in the drawings are exaggerated for convenience of explanation and may be different from actual ratios.

Figure 1:
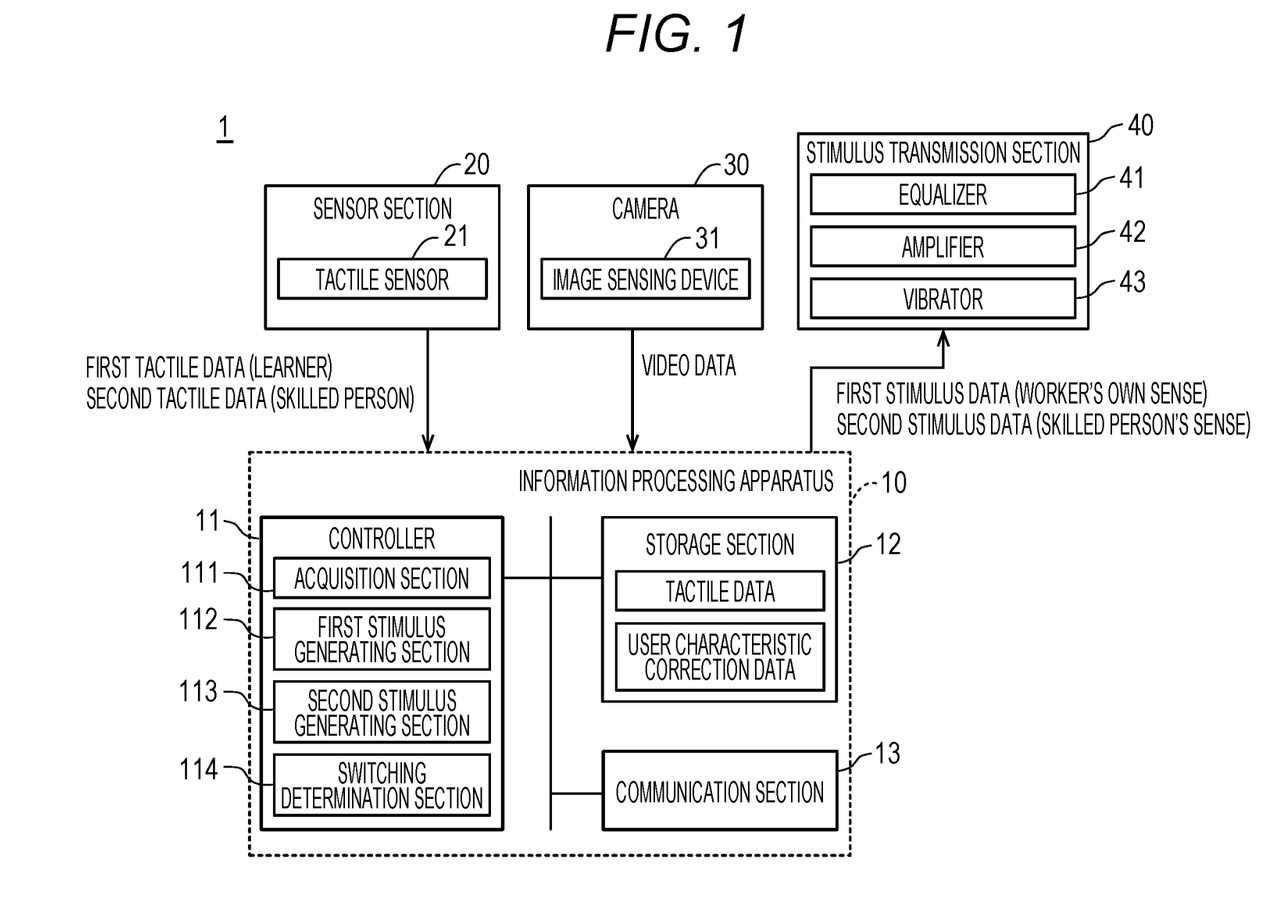
FIG. 1 is a block diagram of a skill acquisition assistance system according to this embodiment.
Figure 2A:
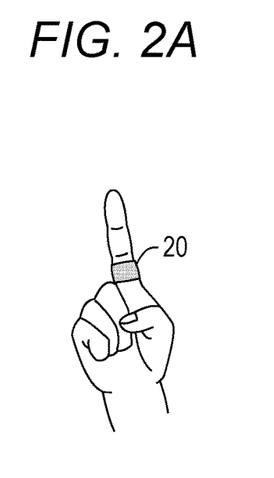
FIGS. 2A to 2C are schematic diagrams illustrating an example of a sensor section and a stimulus transmission section.
Figure 2B:
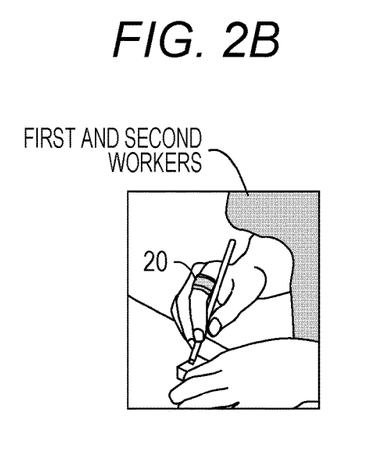
Figure 2C:
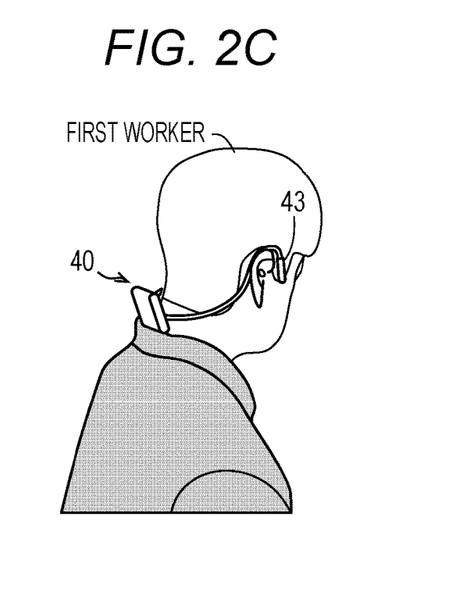

FIG. 1 is a block diagram of a skill acquisition assistance system 1 according to this embodiment. FIGS. 2A to 2C are schematic diagrams illustrating an example of a sensor section 20 and a stimulus transmission section 40. As illustrated in FIG. 1, the skill acquisition assistance system 1 includes an information processing apparatus 10, a sensor section 20, a camera 30, and a stimulus transmission section 40. They are electrically connected for communication.

(Information Processing Apparatus 10)

The information processing apparatus 10 is, for example, a personal computer (PC) and includes a controller 11, a storage section 12, and a communication section 13. In addition, the controller 11 functions as an acquisition section 111, a first stimulus generating section 112, a second stimulus generating section 113, and a switching determination section 114. Those configurations and functions of the information processing apparatus 10 will be described later.

(Sensor Section 20 and First Body Part)

The sensor section 20 includes a tactile sensor 21. The tactile sensor 21 includes any one of a strain sensor, a piezoelectric element, and a polyvinylidene difluoride film (PVDF) sensor. The sensor section 20 is attached to a first body part of the worker and generates tactile data indicating a tactile sense corresponding to the first body part. The first body part is, for example, a finger or a palm. The fingers include five fingers, and the fingers include both fingertips and roots of the fingers. In the example illustrated in FIG. 2A, the sensor section 20 is attached to the root of the index finger as the first body part. The sensor section 20 includes a tactile sensor 21 that detects a sheet-like tactile sense and a main body section that houses the tactile sensor 21 and is fixed to a first body part such as a finger. Note that although not illustrated in FIGS. 1, 2(a), and the like, the sensor section 20 includes a wired cable for transmitting a signal or a near field communication section, and the sensed tactile data is sent to the information processing apparatus 10 through these components. Power supply to the sensor section 20 is performed from a commercial power supply through a power supply cable or is performed by a built-in battery (secondary battery).

FIG. 2B is a diagram illustrating an example of work. FIG. 2B illustrates an example in which a worker polishes a member with a pencil-type polishing rod (a count (polishing material or polishing sheet) is attached to the tip) as work. The work is not limited to the polishing work as illustrated in FIG. 2B and includes various kinds of work. For example, in addition to the polishing work, drawing work for drawing a predetermined figure (for example, a spiral figure or a circular figure) and cutting work for cutting a member by hand are included.

(First and Second Workers, First and Second Tactile Data, and First and Second Stimulus Data)

The worker includes a learner (including a beginner) who learns a task and a skilled person (including a technician who is used to a task or has a high skill in a task). In the following description, among the workers, a learner or a beginner who particularly learns certain work is referred to as a "first worker", and a technician or a skilled person who teaches the same work is referred to as a "second worker". In the following description, when simply referred to as a worker, both of the first and second workers are included.

In addition, among tactile data from the sensor section 20 attached to the first body part during work, particularly, the tactile data of the first worker is referred to as "first tactile data", and the tactile data of the second worker is referred to as "second tactile data". In a case where the first and second workers do not work at the same time and the second tactile data recorded in advance is used (hereinafter, also referred to as an offline state), the second tactile data or the first and second tactile data are associated with the type of work and stored in the storage section 12. The stored second tactile data corresponds to one task, and the data length is, for example, several seconds to several tens of seconds. At this time, an identifier such as an ID number for specifying the worker may also be associated with the second tactile data. When the tactile data acquired in real time is reproduced by the stimulus transmission section 40 (step S03 in FIG. 3 and steps S42 and S52 in FIG. 7, which will be described later), the data is temporarily stored in the buffer memory of the storage section 12 and is erased each time the data is reproduced.

As will be described in detail below, the first stimulus generating section 112 of the controller 11 generates first stimulus data on the basis of first tactile data, and the second stimulus generating section 113 generates the second stimulus data on the basis of the second tactile data. The first and second stimulus data (hereinafter, also collectively referred to simply as stimulus data) are transmitted to the stimulus transmission section 40. The stimulus transmission section 40 presents the tactile sense (tactile sensation) based on the first and second stimulus data to the first worker.

(Camera 30)

The camera 30 is a fixed camera provided on a wall, a ceiling, or the like, or a handy camera held by a photographer. The fixed camera and the handy camera may be used in combination. The camera 30 includes an image sensing device 31 and an optical element (not illustrated) such as a lens, photographs the workplace where the worker performs work using the image sensing device 31, and generates video data. The camera 30 has a wired cable for transmitting a signal or a near field communication section, and video data is transmitted to the information processing apparatus 10 through the wired cable or the near field communication section.

(Stimulus Transmission Section 40 and Second Body Part)

The stimulus transmission section 40 includes an equalizer 41, an amplifier 42, and a vibrator 43. The vibrator 43 can present various vibration stimuli having different strengths or rhythms by changing the driving voltage and frequency. In addition, the stimulus transmission section 40 can set the magnitude and direction of the kinesthetic sense to be output by changing the drive voltage and frequency. The stimulus transmission section 40 receives the stimulus data sent from the controller 11.

The stimulus transmission section 40 performs, on the stimulus data (waveform signal), preprocessing of adjustment of frequency characteristics and amplification adjustment by using the equalizer 41 and the amplifier 42. In this preprocessing, the stimulus transmission section 40 may store user characteristic data for each user (first worker) in the storage section 12 in advance and perform different preprocessing depending on the user characteristic data. For example, user characteristic data corresponding to the state of the skin of the user or individual differences (shape, size, sensitivity, and preference) is stored, and in consideration of the user characteristic data, processed stimulus data obtained by performing preprocessing, such as amplification, modulation, and subtraction, with respect to the acquired tactile data is presented. The stimulus transmission section 40 transmits (presents) a tactile sense (tactile sensation) to the first worker wearing the stimulus transmission section 40 by vibrating the vibrator at an intensity (amplitude) and a frequency corresponding to the stimulus data after the preprocessing.

The stimulus transmission section 40 is mounted on the second body part of the first worker (learner) and generates a stimulus on the second body part to transmit the stimulus through a tactile sense to the first worker. The second body part is a body part different from the first body part and is apart from the first body part by a predetermined distance or more. For example, this distance is a distance at which tactile senses are not mixed with each other and the worker can distinguish between the tactile sense of the first body part and the tactile sense caused by the stimulus transmitted to the second body part. The second body part is any body part of the whole body which is different from the first body part. A preferable example of the second body part is any one of the head part (particularly, the temple), the arm, the foot, and the hand in particular.

FIG. 2C illustrates a state in which the stimulus transmission section 40 is worn on the head part (particularly, the temple of the head) as the second body part. In the worn state, the vibrator 43 placed near one or both of the right and left temples vibrates, thereby transmitting a tactile sense corresponding to the stimulus data to the first worker. Note that although not illustrated in FIGS. 1 and 2, and the like, the stimulus transmission section 40 includes a wired cable for transmitting a signal or a near field communication section, and stimulus data is sent to the information processing apparatus 10 through these components. Power supply to the stimulus transmission section 40 is performed from a commercial power supply through a power supply cable or is performed by a built-in battery (secondary battery).

When the first worker has a plurality of parts where he/she learns a tactile sense (tactile sensation), the stimulus transmission section 40 may be attached to a plurality of second body parts, and the stimulus may be transmitted to the plurality of second body parts by a plurality of vibrators of one stimulus transmission section 40. For example, when the first and second tactile data are to be acquired from two positions, that is, the index finger of the right hand and the palm of the hand as the first body parts, the tactile data are reproduced from the two positions by two vibrators arranged near the left and right temples, respectively. For example, the stimulus transmission section 40 reproduces the tactile data from the index finger from the vibrator near the right temple, and reproduces the tactile data from the palm from the vibrator near the left temple.

(Information Processing Apparatus 10)
(Controller 11)

The controller 11 (a hardware processor) is a CPU, which controls respective sections of the apparatus and performs various kinds of arithmetic processing in accordance with programs. The controller 11 functions as an acquisition section 111, a first stimulus generating section 112, a second stimulus generating section 113, and a switching determination section 114.

The acquisition section 111 acquires tactile data from the sensor section 20 and acquires video data from the camera 30 in cooperation with the communication section 13.

The first stimulus generating section 112 generates first stimulus data on the basis of the first tactile data. The second stimulus generating section 113 generates second stimulus data on the basis of the second tactile data.

The switching determination section 114 transmits the first stimulus data or the second stimulus data to the stimulus transmission section 40 by performing trigger determination.

The switching determination section 114 performs the trigger determination in conjunction with a predetermined action of the first body part of the first worker. As the trigger determination, for example, at least one of (trigger determination condition 1) determination based on image analysis and (trigger determination condition 2) determination based on the intensity of the first tactile data can be applied.

(Trigger determination condition 1) In determination by image analysis, whether or not a predetermined action has been performed is determined by analyzing real-time video data acquired from the camera 30. For example, the switching determination section 114 analyzes a change in the motion of the joint point of the first worker using a learned model related to skeleton detection and determines whether or not a predetermined action in the work has been performed. For example, in the case of polishing work, the switching determination section 114 determines that the trigger condition is satisfied by recognizing that the polishing rod is pressed against the member to be polished from a change in the relative positions of coordinate information of the polishing member and the polishing rod and the coordinate information of a joint point of a hand, an arm, or the like.

(Trigger determination condition 2) In the determination based on the intensity of the first tactile data, in a case where a signal change of the tactile data equal to or greater than a predetermined threshold (for example, a signal change amount in a short predetermined period is equal to or greater than a predetermined threshold) is input in real time from the sensor section 20 used by the first worker, the switching determination section 114 determines that the trigger determination condition is satisfied.

(Storage Section 12)

The storage section 12 is configured by a semiconductor memory and/or a magnetic recording medium memory. The storage section 12 stores the tactile data and user characteristic correction data.

(Communication Section 13)

The communication section 13 is an interface for communicating with another device via a wire or wirelessly. For wireless communication, the communication section 13 can use a wireless communication standard such as Bluetooth (registered trademark) Low Energy (BLE), Bluetooth (registered trademark), IEEE802.11, or IrDA.

(Skill Acquisition Assistance Method According to First Embodiment)

Figure 3:
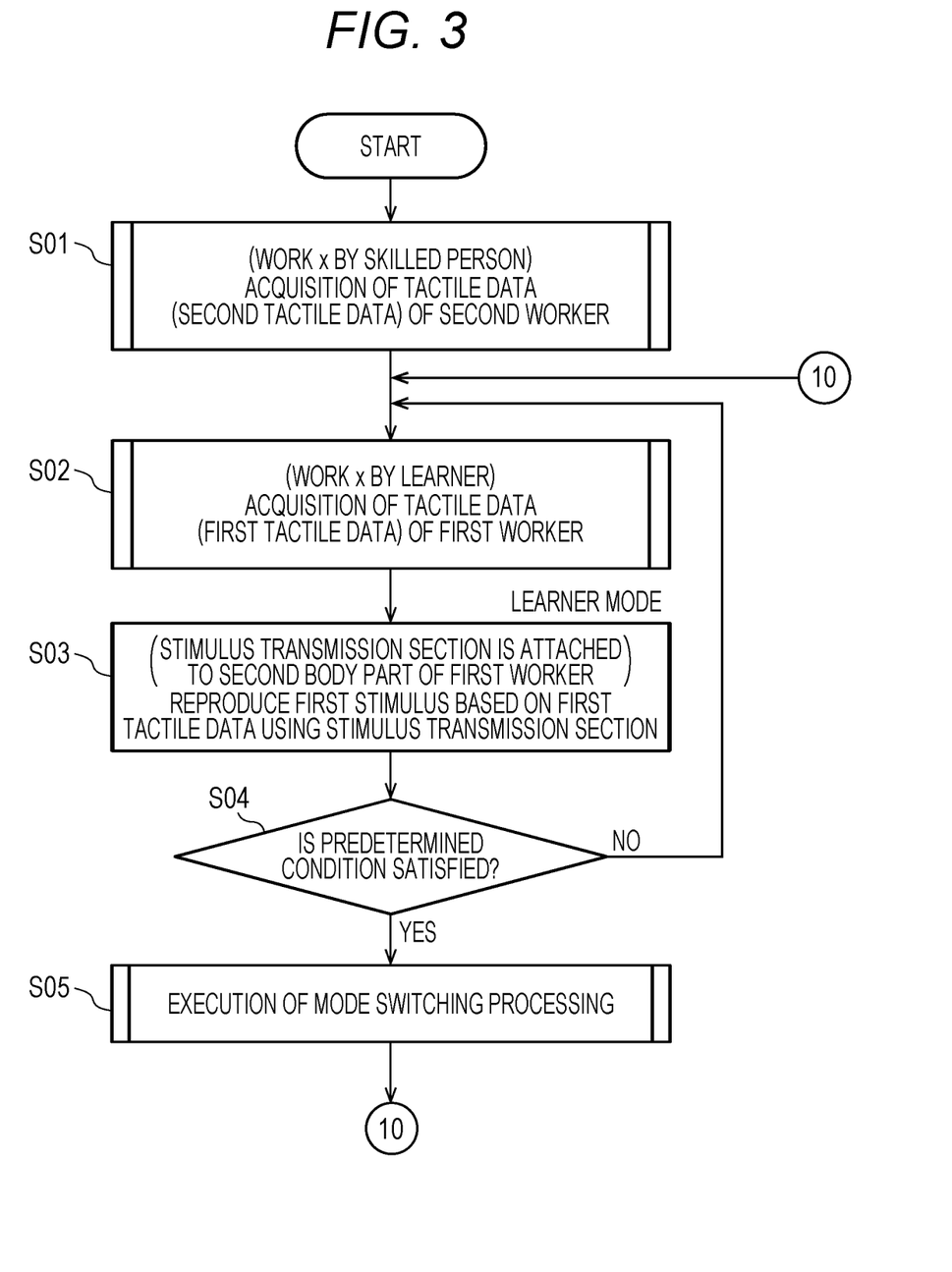
FIG. 3 is a flowchart illustrating the skill acquisition assistance method according to the first embodiment.
Figure 4:
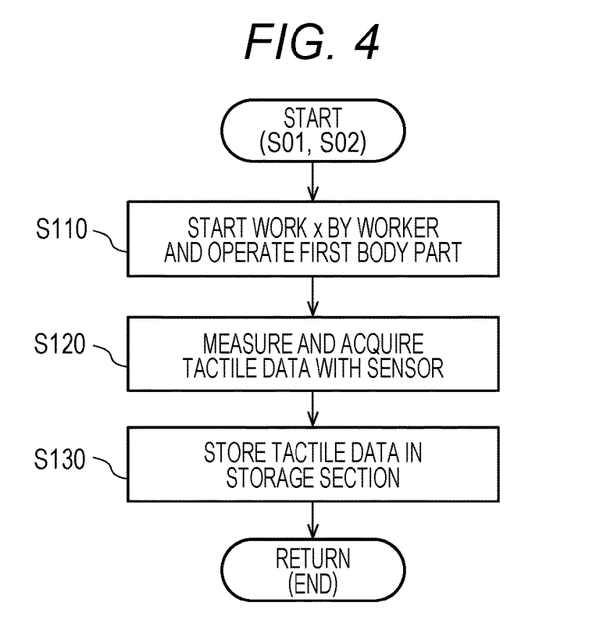
FIG. 4 is a subroutine flowchart illustrating tactile data acquisition processing in step S01 (or S02)

Next, a skill acquisition assistance method according to the first embodiment will be described with reference to FIGS. 3 to 5. FIG. 3 is a flowchart illustrating the skill acquisition assistance method according to the first embodiment.

(Step S01)

The acquisition section 111 acquires data concerning given work (to be referred to as work x hereinafter; the work x can be various kinds of work). For example, the acquisition section 111 acquires the second tactile data of the second worker related to the polishing work or the drawing work illustrated in FIG. 2B. The processing here is illustrated in a subroutine flowchart of FIG. 4.

(Step S110)

The second worker (skilled person) starts the work x and operates the first body part.

(Step S120)

With the work x in step S110, the acquisition section 111 acquires the second tactile data of the first body part measured by the sensor section 20.

(Step S130)

The information processing apparatus 10 stores the second tactile data acquired in step S120 in the storage section 12. The process in FIG. 4 is completed as described above, and the process returns to step S02 in FIG. 3.

(Step S02)

The acquisition section 111 acquires the first tactile data of the first worker regarding the same work x performed in step S01. Although a description will be omitted, the processing here is also performed similarly according to the subroutine flowchart of FIG. 4.

(Step S03)

The skill acquisition assistance system 1 transmits the stimulus based on the first tactile data acquired in step S02 to the first worker by the stimulus transmission section 40 mounted on the second body part of the first worker. More specifically, the first stimulus generating section 112 generates first stimulus data on the basis of first tactile data. Then, the switching determination section 114 transmits the first stimulus data to the stimulus transmission section 40. The stimulus transmission section 40 that has received the first stimulus data presents the first stimulus data to the first worker as the first stimulus. The acquisition of the first tactile data in step S02 and the presentation of the first stimulus in step S03 based thereon are generally performed in real time (for example, waveform 1 in FIG. 6 described below is reproduced). Hereinafter, the process of reproducing the first stimulus based on the first tactile sense of the first worker (learner) in this processing is also referred to as a learner mode.

(Step S04)

The controller 11 determines whether or not a predetermined condition is satisfied. The predetermined condition is, for example, a case where a predetermined time has elapsed from the start of the processing in step S02 for the first time or a case where an input instruction to start execution of the mode switching instruction by the first worker is received by an input device such as an operation panel (not illustrated) of the information processing apparatus 10. This is also a case where it is determined that preparation for execution of the given work x has been performed based on the video of the camera 30. If the predetermined condition is satisfied (YES), the controller 11 allows the process to proceed to step S05. If the predetermined condition is not satisfied (NO), the controller 11 repeats the processing in step S02 and subsequent steps.

(Step S05)

Figure 5:
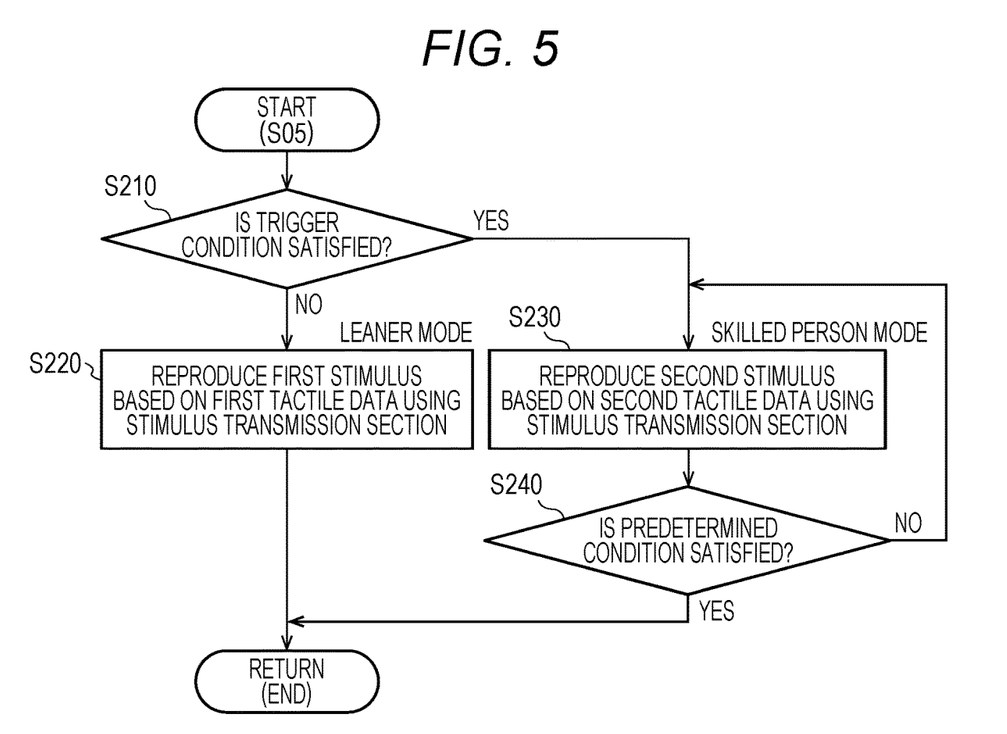
FIG. 5 is a subroutine flowchart illustrating mode switching processing in step S05.

Here, the switching determination section 114 mainly executes the mode switching processing illustrated in FIG. 5. FIG. 5 is a subroutine flowchart illustrating the processing in step S05.

(Step S210)

The switching determination section 114 determines whether or not the trigger condition is satisfied by satisfying the above-described trigger determination condition 1 or condition 2. For example, upon analyzing a video from the camera 30 under the trigger determination condition 1 and recognizing that a specific action of the work x will be started, the switching determination section 114 determines that the trigger condition is satisfied (YES) and allows the process to proceed to step S230. On the other hand, when the switching determination section 114 determines that the trigger condition is not satisfied (NO), the process proceeds to step S220.

(Step S220)

The processing here is processing similar to that in step S03. The switching determination section 114 transmits the stimulus data based on the first tactile data generated by the first stimulus generating section 112 to the stimulus transmission section 40. The stimulus transmission section 40 (worn by the first worker) that has received the first stimulus reproduces the first stimulus (the first worker's own sense) in real time.

(Step S230)

Here, the switching determination section 114 sends, to the stimulus transmission section 40, the stimulus data based on the second tactile data generated by the second stimulus generating section 113. The stimulus transmission section 40 (worn by the first worker) that has received the second stimulus reproduces the second stimulus (expert's sense). The second stimulus to be reproduced is the second stimulus data generated on the basis of the second tactile data stored in the storage section 12 (for example, waveform 2 illustrated in FIG. 6 described below). Hereinafter, the process of reproducing the first stimulus based on the second tactile sense of the second worker (learner) in this processing is also referred to as a skilled person's mode.

(Step S240)

The controller 11 determines whether or not a predetermined condition is satisfied. For example, this is a case where a predetermined time has elapsed from the start of the processing in step S230 for the first time. If the predetermined condition is not satisfied (NO), the controller 11 continues the processing in step S230. If the predetermined condition is satisfied (YES), the controller 11 ends the processing in FIG. 5 and returns to the processing in FIG. 3. Subsequently, referring to FIG. 3, the processing after step S02 (circled number 10) is repeated until the end of the processing is determined under the control of the upper level.

As described above, the skill acquisition assistance method according to the first embodiment executes the processing including a first tactile data acquisition step of acquiring first tactile data indicating a tactile sense corresponding to a first body part based on the action of the first body part during work time when a first worker performs work, a second tactile data acquisition step of acquiring second tactile data indicating a tactile sense corresponding to a first body part based on the action of the first body part during work time when a second worker performs the same work, a first stimulus generating step of generating a first stimulus based on the first tactile data by a stimulus transmission section mounted on a second body part different from the first body part of the first worker, and a second stimulus generating step of switching the stimulus generated by the stimulus transmission section to a second stimulus based on the second tactile data in conjunction with the action of the first body part of the first worker.

This makes it possible for the first worker to recognize and compare the tactile sense of his/her own body part with the tactile sense of a skilled person without disturbing the tactile sense of his/her body part or the action during work when the first worker performs work as a skill learning target, and to immediately correct the action of the first worker himself/herself without affecting workability. In particular, in the learning mode of reproducing the first stimulus based on the first tactile sense of the first worker (learner), the first worker meta-perceives the first tactile sense by feeling the tactile sense of the first stimulus at the second body part (for example, the temple) while maintaining the sense of the first body part (for example, the fingertip) during an operation in work. Then, by executing the skilled person mode for switching to and reproducing the second stimulus based on the second tactile sense of the second worker (skilled person) stored in advance, the first worker can experience the tactile sense of the first body part of the skilled person as the second stimulus on the second body part while obtaining the actual tactile sense of the first body part (fingertip) of the first worker. This allows the first worker to easily imitate a difference in action from the skilled person such as, intensity, the rhythm of intensity, the direction of motion, and phenomena caused by motion (friction and the like), which are senses conventionally called technical tips, while overlapping his/her own action over the action of the skilled person at the time of work, and adjust the motion so as to match the senses, thereby efficiently performing skill acquisition.

First Modification Example

In the first embodiment illustrated in FIG. 5 described above, the second stimulus based on the second tactile data by the second worker (skilled person) is reproduced in the skilled person mode. In the first modification example, at the time of switching from the first stimulus reproduced so far (in the learning mode) to the second stimulus, a composite stimulus generated by combining the first and second stimuli.

Figure 6:
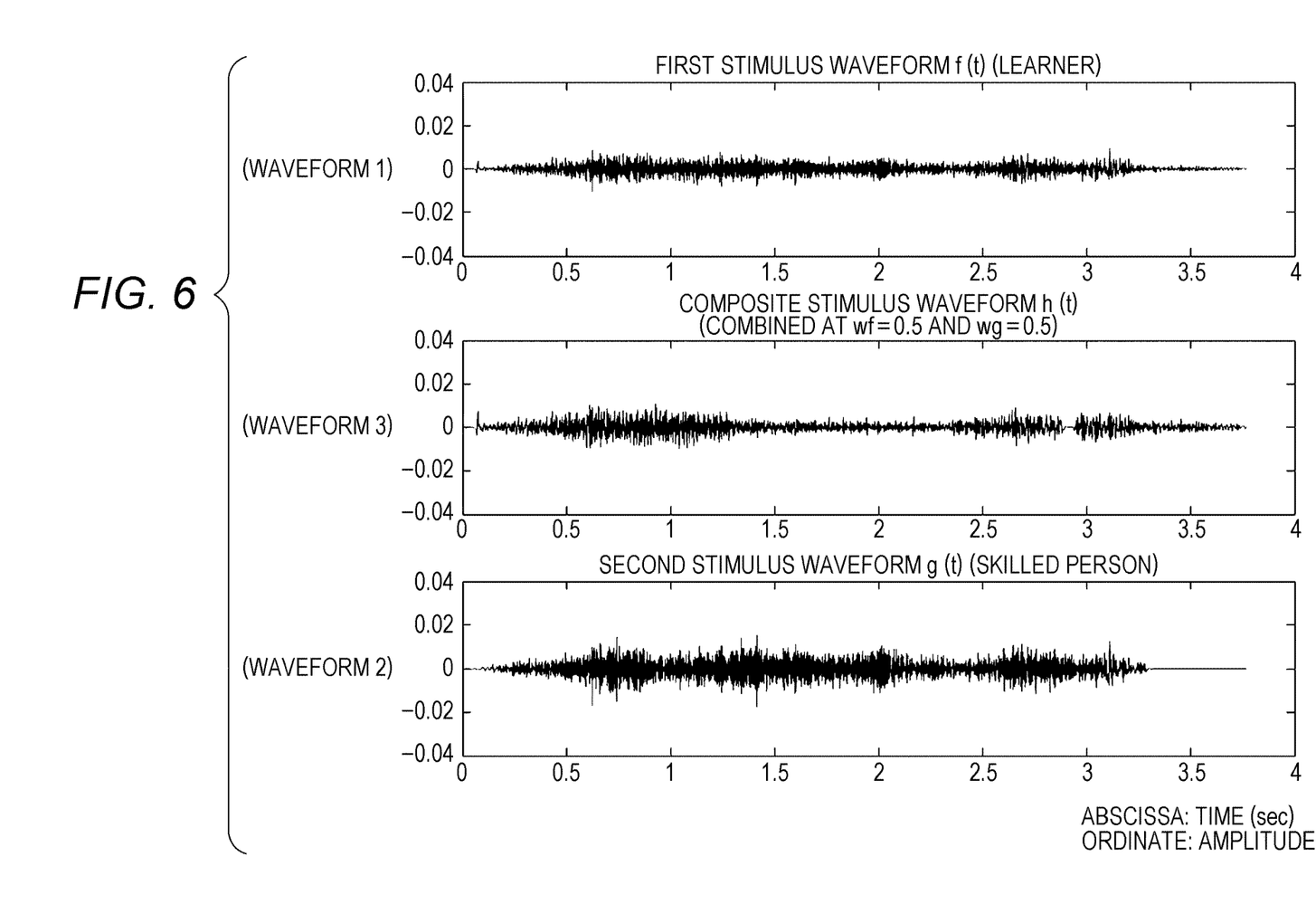
FIG. 6 is a diagram illustrating first and second stimulus waveforms and their combined stimulus waveform.

FIG. 6 is a diagram illustrating first and second stimulation waveforms and their combined stimulation waveform. Referring to FIG. 6, waveform 1 represents the first stimulus waveform f(t), waveform 2 represents the second stimulus waveform g(t), and waveform 3 represents the composite stimulus waveform h(t) when wf and wg are both 0.5.

The composite stimulus waveform h(t)=f(t)×wf+g(t)×wg.

The ratios wf and wg are set so that the sum is 1, and the composition ratio is not limited to 0.5 and can be appropriately set. As a result, when learning the skill related to work, it becomes easy to match with the action matched with the second stimulus without a sense of discomfort, the number of trial and error at the time of matching is reduced, and it becomes possible to learn more efficiently.

Second Embodiment

The first embodiment relates to an offline skill acquisition assistance method. The second embodiment described below relates to a real-time skill acquisition assistance method. In an offline state, previously stored tactile data was used as the tactile data obtained by the work x performed by the second worker. In a real-time mode according to the second embodiment, the first and second workers perform the same work at the same time while communicating with each other by visually checking each other or checking each other through a monitor.

Figure 7:
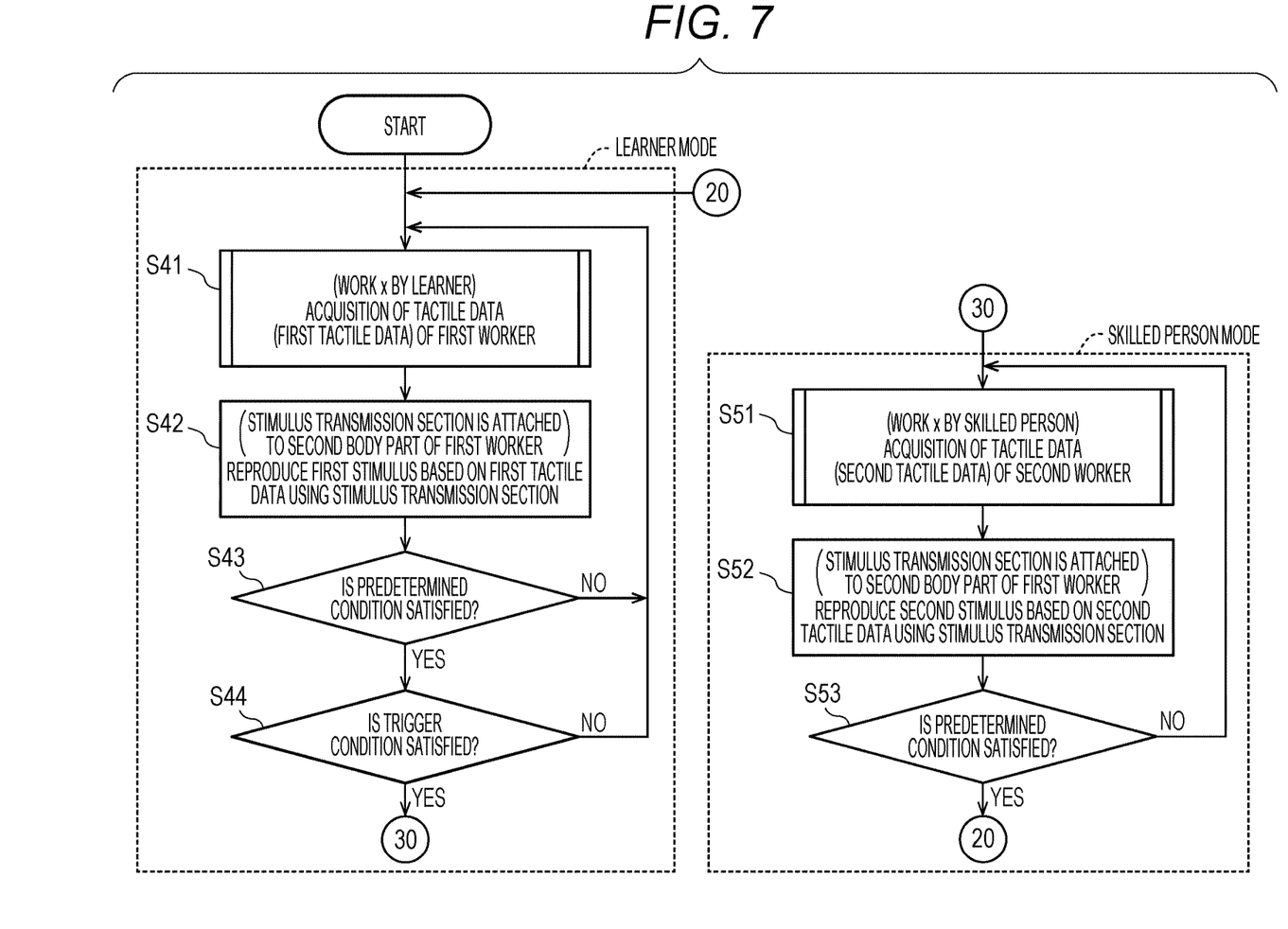
FIG. 7 is a flowchart illustrating a skill acquisition assistance method according to the second embodiment (real time).

FIG. 7 is a flowchart illustrating a skill acquisition assistance method according to the second embodiment (real time).

(Steps S41 to S43)

The processing here is reproduction of the tactile data of the first worker himself/herself in the learner mode. The controller 11 causes the stimulus transmission section 40 worn by the first worker (learner) to reproduce, as a first stimulus, the first tactile data obtained in association with the action of the first worker during work. The processes in steps S41 to S44 respectively correspond to those in steps S02, S03 (S220), S04, and S210 in FIGS. 3 and 5, and a description thereof will be omitted.

(Steps S51 to S53)

The processing here is reproduction of the tactile data of the second worker (skilled person) himself/herself in the skilled person mode. The controller 11 causes the stimulus transmission section 40 worn by the second worker (learner) to reproduce, as a second stimulus, the first tactile data obtained in association with the action of the second worker during work. The processes in steps S51 to S53 respectively correspond to those in steps S01, S230, and S240 in FIGS. 3 and 5, and a description thereof will be omitted.

Thus, in the second embodiment, by executing the same processing as that in the first embodiment in real time, the same effects as those of the first embodiment can be obtained.

The above-described configuration of the skill acquisition assistance system 1 has been described as a main configuration for describing the features of the above-described embodiment and is not limited to the above-described configuration, and various modifications can be made within the scope of the claims. Furthermore, the configurations of a general skill acquisition assistance system are not excluded.

Each Modification Example

The stimulus transmission section 40 may further include a speaker in addition to the vibrator. When transmitting tactile sensation, the stimulus transmission section 40 further emits sound from the speaker and transmits the sound to the first worker.

As another example, switching from the first stimulus to the second stimulus may be performed by a third party other than the skilled person and the learner or may be performed manually by the skilled person in accordance with the action of the learner by visual observation or the like. Furthermore, in the second embodiment, it is possible to transmit a stimulus not only to a learner but also to an expert. This obtains the effect of activating communication between the learner and the skilled person so as to provide an instructions, advices, and the like from the skilled person.

The processing in the skill acquisition assistance system 1 or the skill acquisition assistance method according to the above-described embodiment may include steps other than the steps illustrated in the above-described flowcharts or may not include some of the above-described steps. For example, one of steps S03 and S220 may be omitted. Furthermore, the order of the steps is not limited to the above-described embodiment. Furthermore, each step may be combined with another step to be executed as one step, may be included in another step to be executed, or may be divided into a plurality of steps to be executed. Further, the embodiments may be implemented in combination. For example, the first and second modification examples may be implemented in combination with the second embodiment.

Furthermore, the means and method for performing various kinds of processing in the skill acquisition assistance system according to the above-described embodiment can be implemented by either a dedicated hardware circuit or a programmed computer. The program may be provided by a computer-readable recording medium such as a USB memory or a digital versatile disc (DVD)-ROM or may be provided online via a network such as the Internet. In this case, the program recorded on the computer-readable recording media is usually transferred to a storage section such as a hard disk and stored therein. Furthermore, the program may be provided as a single piece of application software or may be incorporated as a function of an apparatus into software of the apparatus.

Although embodiments of the present invention have been described and illustrated in detail, the disclosed embodiments are made for purpose of illustration and example only and not limitation. The scope of the present invention should be interpreted by terms of the appended claims.

What is claimed is:

1. A skill acquisition assistance method comprising:
a first tactile data acquisition step of acquiring first tactile data indicating a tactile sense corresponding to a first body part based on an action of the first body part during work time when a first worker performs work;
a second tactile data acquisition step of acquiring second tactile data indicating a tactile sense corresponding to a first body part based on an action of the first body part during work time when a second worker performs the same work;
a first stimulus generating step of generating a first stimulus based on the first tactile data by a stimulus transmission section mounted on a second body part different from the first body part of the first worker; and
a second stimulus generating step of switching a stimulus generated by the stimulus transmission section to a second stimulus based on the second tactile data in conjunction with the action of the first body part of the first worker.

2. The skill acquisition assistance method according to claim 1, wherein the first worker is a learner related to the work, and the second worker is a skilled person related to the work.

3. The skill acquisition assistance method according to claim 1, wherein the second stimulus generating step is executed by utilizing, as a trigger, a case in which a signal change of tactile data based on an action of the first body part, as a predetermined action among actions of the first body part, has become not less than a predetermined threshold value.

4. The skill acquisition assistance method according to claim 1, wherein a video obtained by photographing the first worker is analyzed as a predetermined action among actions of the first body part, and the second stimulus generating step is executed by utilizing, as a trigger, a case in which a change in coordinate information of the first body part by image recognition satisfies a predetermined condition.

5. The skill acquisition assistance method according to claim 1, wherein the second body part is a part separated from the first body part by not less than a predetermined distance.

6. The skill acquisition assistance method according to claim 1, wherein the first body part is a finger or a fingertip, and the second body part is any one of a head part, an arm, a foot, and a back of a hand.

7. The skill acquisition assistance method according to claim 1, wherein there are a plurality of the first body parts, and there are a plurality of the second body parts corresponding to the plurality of the first body parts.

8. The skill acquisition assistance method according to claim 1, wherein the stimulus generated by the stimulus transmission section is vibration.

9. The skill acquiring assistance method according to claim 1, wherein when in switching from the first stimulus to the second stimulus, a composite stimulus is generated by combining the first stimulus with the second stimulus.

10. A skill acquisition assistance system comprising:
a sensor section that acquires tactile data indicating a tactile sense corresponding to a first body part based on an action of the first body part during work;
a stimulus transmission section that is worn on a second body part different from the first body part and transmits a stimulus to the second body part; and
a hardware processor that causes the stimulus transmission section to generate a stimulus based on the tactile data,
wherein the hardware processor acquires first tactile data during work performed by a first worker and second tactile data during the same work performed by a second worker, causes the stimulus transmission section worn by the first worker to generate a first stimulus based on the first tactile data, and switches a stimulus generated by the stimulus transmission section to a second stimulus based on the second tactile data in conjunction with an action of the first body part of the first worker.

11. The skill acquisition assistance system according to claim 10, wherein the first worker is a learner related to the work, and the second worker is a skilled person related to the work.

12. The skill acquisition assistance system according to claim 10, wherein a stimulus generated by the stimulus transmission section is switched to a second stimulus based on the second tactile data by utilizing, as a trigger, a case in which a signal change of tactile data based on an action of the first body part, as a predetermined action among actions of the first body part, has become not less than a predetermined threshold value.

13. The skill acquisition assistance system according to claim 10, wherein a video obtained by photographing the first worker is analyzed as a predetermined action among actions of the first body part, and a stimulus generated by the stimulus transmission section is switched to a second stimulus based on the second tactile data by utilizing, as a trigger, a case in which a change in coordinate information of the first body part by image recognition satisfies a predetermined condition.

14. The skill acquisition assistance system according to claim 10, wherein the second body part is a part separated from the first body part by not less than a predetermined distance.

15. The skill acquisition assistance system according to claim 10, wherein the first body part is a finger or a fingertip, and the second body part is any one of a head part, an arm, a foot, and a back of a hand.

16. The skill acquisition assistance system according to claim 10, wherein there are a plurality of the first body parts, and there are a plurality of the second body parts corresponding to the plurality of the first body parts.

17. The skill acquisition assistance system according to claim 10, wherein the stimulus generated by the stimulus transmission section is vibration.

18. The skill acquiring assistance system according to claim 10, wherein when in switching from the first stimulus to the second stimulus, a composite stimulus is generated by combining the first stimulus with the second stimulus.

19. A non-transitory computer readable recording medium storing a control program for causing that instructs a computer to execute processing including:
- a first tactile data acquisition step of acquiring first tactile data indicating a tactile sense corresponding to a first body part based on an action of the first body part during work time when a first worker performs work;
- a second tactile data acquisition step of acquiring second tactile data indicating a tactile sense corresponding to a first body part based on an action of the first body part during work time when a second worker performs the same work;
- a first stimulus generating step of generating a first stimulus based on the first tactile data by a stimulus transmission section mounted on a second body part different from the first body part of the first worker; and
- a second stimulus generating step of switching a stimulus generated by the stimulus transmission section to a second stimulus based on the second tactile data in conjunction with the action of the first body part of the first worker.

* * * * *